United States Patent [19]

Schmid et al.

[11] Patent Number: 5,756,647
[45] Date of Patent: May 26, 1998

[54] PROCESS FOR ACTIVATED ANIONIC LACTAM POLYMERIZATION

[75] Inventors: Eduard Schmid, Bonaduz, Switzerland; Roman Eder, Filderstadt, Germany

[73] Assignee: EMS-Inventa AG, Zurich, Switzerland

[21] Appl. No.: 786,710

[22] Filed: Jan. 21, 1997

[30] Foreign Application Priority Data

Jan. 25, 1996 [DE] Germany ............ 196 03 302.0

[51] Int. Cl.$^6$ ............ C08G 69/20; C08G 69/18
[52] U.S. Cl. ............ 528/323; 528/310; 528/312; 528/324; 528/332; 528/335; 528/338; 528/340; 528/349
[58] Field of Search ............ 528/310, 312, 528/335, 323, 324, 340, 332, 338, 349

[56] References Cited

U.S. PATENT DOCUMENTS

| | | | |
|---|---|---|---|
| 3,575,938 | 4/1971 | Tierney | 528/322 |
| 3,671,501 | 6/1972 | Johnson | 528/315 |
| 3,755,266 | 8/1973 | Matzner et al. | 528/315 |
| 3,755,267 | 8/1973 | Matzner et al. | 528/315 |
| 3,879,354 | 4/1975 | Bonner | 528/315 |
| 4,042,572 | 8/1977 | Buhac et al. | 528/315 |
| 4,155,948 | 5/1979 | Hergenrother et al. | 528/315 |
| 4,195,163 | 3/1980 | Meyer et al. | 528/315 |
| 4,448,956 | 5/1984 | Lenke et al. | 528/312 |
| 4,501,821 | 2/1985 | Hodek et al. | 502/155 |
| 4,599,398 | 7/1986 | Hodek et al. | 528/312 |

FOREIGN PATENT DOCUMENTS

| | | |
|---|---|---|
| 0438762 | 12/1990 | European Pat. Off. . |
| 1495132 | 7/1963 | Germany . |
| 2230732 | 6/1972 | Germany . |

OTHER PUBLICATIONS

"BASF Intermediate Products", 1993. The month of publication is not available.
"Plastics Manual", vol. VI, Polyamides, published by C. Hanser, München. The date of publication is not available.
German Abstract, "Farben und Lacke", pp. 911–915. The date of publication is not available.

*Primary Examiner*—P. Hampton-Hightower
*Attorney, Agent, or Firm*—Browdy and Neimark

[57] ABSTRACT

A process for the activated anionic lactam polymerization is proposed, wherein a liquid system is employed, which simultaneously contains activator and anionic catalyst for the polymerization of the lactam.

20 Claims, No Drawings

PROCESS FOR ACTIVATED ANIONIC LACTAM POLYMERIZATION

FIELD OF THE INVENTION

The invention relates to a process for activated anionic lactam polymerization, and to shaped polylactam parts which can be produced by means of the process.

BACKGROUND OF THE INVENTION

In accordance with the relevant prior art, polyamides are mainly produced in accordance with the method of so-called hydrolytic polymerization from molten lactams at temperatures of approximately 200° to 320° C., wherein often a pressure phase with the addition of water is interposed ahead for opening the rings of the lactam. This reaction proceeds slowly. The reaction product, preferably a granular material, is converted to useful articles in a subsequent step, for example by means of an injection molding or extrusion process.

Strong bases which, for example, lead to the formation of metal lactamate, can also cause the conversion of lactam to polyamide. The corresponding polymerization reaction proceeds slowly and was replaced by the activated anionic lactam polymerization, wherein the reaction is greatly accelerated and the polymerization temperature can be lowered below the melting point of the polymer. In this method the catalyst and activator are separately added to the molten lactam.

Customarily, the catalyst usually is a solid, for example alkali- or alkaline earth-lactamate. Also, many of the activators (or co-catalysts), such as carbodiimide and blocked isocyanates, are solids. The disadvantage of the free isocyanates, many of which are liquids, is their high toxicity.

The anionic lactam polymerization and the activated anionic lactam polymerization, as well as all aspects of polyamide synthesis and the corresponding applications are described, for example, in the Plastics Manual, Volume VI, Polyamides, C. Hanser, publishers, München.

The activated anionic lactam polymerization is generally performed for producing so-called cast parts or semi-finished parts of large dimensions, such a profiles, preferably in accordance with the so-called 2-tank method.

Here, respective lactam melts of the same volume and containing the catalyst or the co-catalyst are produced, combined and intensely mixed. This starts the polymerization and the melt can be processed immediately thereafter into finished parts, for example by means of the so-called monomer casting method.

In this process it is necessary to observe as much as possible that the lactam melts are free of water and oxygen, the mixing and processing steps take place in an inert gas, and the activated melt is very quickly processed, since it has only a limited time for processing.

So-called liquid catalyst systems were developed to ease the rapid and homogeneous distribution of the catalyst, for example magnesium or sodium lactamate, in the lactam melt.

Reference is made in German Patent Publication DE-22 30 732 C3 to the difficulties caused by the addition of catalysts in solid form, for example metallic lactamate, to the activator-containing lactam melt. An inhomogeneous polymer is created unless rapid dissolving and even distribution are assured.

To solve the problem, a solution of alkali lactamate in lactam, which is liquid at 90° C., which additionally contains 0.3 to 5.0 weight-% of a low-volatile amine, is proposed by German Patent Publication DE-A-14 95 132.

A catalyst solution of metal lactamate in an N,N- disubstituted urea, in particular in N-methylpyrrolidone, is described in U.S. Pat. No. 3,575,938. The improved addition and distribution of this catalyst solution in an activated lactam melt also permits the production of mineral-filled products.

In accordance with the teachings of German Patent Publication DE 22 30 732 C3 it is necessary to prevent the formation of crust, quickly exhibited by catalyst solutions made of alkali lactamate in 2-pyrrolidone and which interferes with the process, by the addition of higher alcohols.

Catalyst solutions with a high degree of stability when stored even at low temperatures are described in European Patent Publication EP 0 438 762 B1, which allow a rapid reaction and lead to polyamide with a relatively low extractable content. They consist of lactam, 2-pyrrolidone, special glycols, hydrocarbons and selectively contain amine.

However, in the cited prior art it is necessary for performing the activated alkaline lactam polymerization to use the solutions of the activator and the catalyst separately.

A preferred way of so proceeding is that first a homogeneous solution of the activator and, if required, further additives, in an anhydrous lactam melt is prepared and, in a further process step for initiating the polymerization reaction, the catalyst, preferably dissolved in lactam, is added and is homogeneously distributed in the melt.

In this case high demands are made on the freedom of the solutions from oxygen and water: mixing in the reaction vessel and processing must be performed in a dry inert gas.

Since, for sufficiently short reaction times in the process, accelerators are also required besides the catalyst, it is necessary to operate in accordance with exactly fixed ways of proceeding.

In a general procedure melts of about equal volume are produced, containing the dissolved catalyst or activator. Then they are mixed, thus initiating polymerization. The disadvantage of these processes is that it is necessary to prepare two different melts in two different vessels, wherein the catalyst-containing melt has only a limited pot-live, even in the absence of the activator. After pouring the melts together, only a limited time for the processing in which the combined and activated melt is of sufficient low viscosity, remains, so that no intermediate storage of the activated melt is possible, and the shaping, for example in a casting process, must immediately take place.

In other processes it is necessary to empty the two vessels with a catalyst or activator, to intermix the melts continuously in a mixing step and to subsequently process the melt activated in this way.

Here, too, the problems of the limited storage time of the melts remains unchanged.

In further processes in accordance with the prior art, for example in accordance with U.S. Pat. No. 3,575,938, the activator and selectively dry additives, such as fibers, are mixed into the lactam melt and the catalyst solution added to in a subsequent step and homogeneously distributed by intense mixing. This way of adding and distributing is made easier if it is possible to work with a catalyst solution. However, the process still remains a multi-step one.

OBJECT AND SUMMARY OF THE INVENTION

It is the object of the instant invention to overcome the disadvantages of the prior art by means of a process using an improved catalytic system, and to simplify the lactam polymerization in this way.

This object is particularly attained by means of a process which is performed by using a system which is stable when stored and liquid at room temperature, which simultaneously contains the activator and the catalyst for the anionic lactam polymerization, which makes the use of separate melts of activator and of catalyst unnecessary and therefore assures to the activated anionic lactam polymerization a considerable expansion of the applications of the production parameters and the processes.

In this case it is of particular advantage that, besides the activator/catalyst liquid system, it is only necessary to have the lactam, or its pure melt, which is stable in storage. Then the lactam is both catalyzed and activated directly before shaping by the addition of only the one liquid system.

This liquid system distributes rapidly and evenly in the lactam melt and thus initiates the polymerization homogeneously.

This represents an essential advantage, in particular for laurinlactam which, because of its high melting point of almost 160° C., has to be stored as a melt in the range of at least 160° C., and whose storage capability in the presence of a catalyst is greatly limited at this temperature.

For the process in accordance with the invention, one single storage vessel for the molten pure lactam is therefore sufficient which, free of the catalyst or activator, can be easily stored in an inert gas atmosphere.

Because of the use of the liquid system, the process in accordance with the invention is excellently suited for the polymerization and processing of lactams, in particular caprolactam and enantholactam, and more particularly of laurinlactam and their mixtures. It is understood that the high polymerization speed also requires rapid further processing of the melt followed by shaping processing stage.

The liquid system which in accordance with the process of the invention is to be added to the anhydrous lactam melt essentially consists of a) 20 to 80 parts by weight of
 a1) at least one N-substituted carboxylic acid amide compound, and/or
 a2) at least one N,N'-disubstituted urea compound, both of which can also contain a heterocyclic ring formed by their substituents, as the base component and solvent,
b) 5 to 30 parts by weight of at least one alkali or alkaline earth lactamate as the catalyst,
c) 5 to 30 part by weight of at least one compound activating the anionic lactam polymerization,
wherein a), b) and c) add up to 100 parts by weight, and which additionally selectively consists of
d) process- and/or use-dependent additives, which do not or only minimally affect the polymerization and are compatible with the components a), b) and c).

The N,N'-disubstituted urea compounds a2) are described, for example, in the BASF company publication "BASF-Zwischenprodukte 1993"[BASF Intermediate Products].

The N-substituted carboxylic acid amide compounds a1) and alkali and alkaline earth lactamates b) are described in U.S. Pat. No. 3,575,938.

Preferred activating compounds c) are blocked isocyanates, particularly those blocked with lactam, in particular diphenyl methane diisocyanates, hexamethylene diisocyanate, toluol diisocyanate, isophorone diisocyanate, m- and p-xylene diisocyanate or phenyl isocyanate, mono- or polycarbodiimides, such as, for example, N,N'-diisopropyl carbodiimide, N,N'-di-(o-tolyl)- carbodiimide, N,N'-dicyclohexyl carbodiimide, 2,2',6,6'-tetraisopropyl diphenyl carbodiimide and poly-(2,2-diisopropyl)-p- phenylene carbodiimide, as well as acylated lactams, among which are acetylated capro- and laurinlactam in particular, as well as oxazoline derivatives, oxazolines, oxazolones, N-substituted 2- oxazolidones, fatty alkyl oxazolines and bisoxazolines, prepared with hydroxy acids such as ricinoleic acid, and their reaction products with isocyanates and diisocyanates, carbodiimide, acylated lactams, as well as oxazoline compounds, such as bisoxaline bridged with diisocyanates, such as described, for example, in Farben und Lacke [Paints and Lacquers] 1993/11, pp. 911 to 915.

According to the invention, pure anhydrous lactam as a melt is taken from the storage container and brought to a mixing device. There the liquid system, preferably in a proportion of 0.5 to 15 weight-%, is added under intense mixing and a control of the temperature, and the melt is activated. Thereafter it is immediately subjected to a processing and/or shaping step.

The polymerization is accelerated so greatly by raising the process temperature, preferably to 200° to 320° C., in particular to 240° to 290° C., that it may take place within 30 to 200 seconds.

In a preferred embodiment by varying the amount of the liquid system and the process temperature, the activated, catalyst-containing melt is polymerized to such an extent that it can directly be supplied to a shaping operation, while selectively interposing complementing process steps, such as admixing of additives.

It is possible without problems to add process- and/or use-dependent additives to the freshly activated melt, which initially is still of sufficient low viscosity and liquid. These additions are of course also possible in any other step of the process.

Because of the fast reaction and the immediately following shaping, it is possible in an advantageous manner in connection with the process of the invention, to add additives which sediment easily.

In addition, in a special embodiment, for example when using heavy fillers, it is possible to add well dried, finely dispersed silicic acid or other, thixotropically acting additives.

Preferably used additives d) are:
 processing aids, plasticizers, light and heat stabilizers, antioxidants, optical brighteners, pigments, dyestuffs, tracers and aromatics, known from the prior art.

Preferred further process-related additives are, for example, liquid plasticizers, in particular carboxylic acid ester in property-relevant concentrations, for example 3 to 13 parts by weight. Liquid plasticizers are advantageously used with small technical outlay for the simplified addition and distribution of the liquid system in the lactam melt, and in particular for the homogeneous initiation and performance of the lactam polymerization.

A homogeneously activated melt stream is created in a continuous process variant by dosing the liquid system into a dry lactam melt, which is continuously conveyed by suitable mixing and conveying elements, which is at least sufficiently polymerized that it can be directly supplied to a shaping tool. In this connection, gear pumps or multi-shaft meshing conveying screws or other devices in accordance with the prior art are preferably used for the constant conveyance of the melt.

A subsequent thermal treatment of the polyamide is provided in another preferred embodiment variant, preferably just below its melting point and advantageously in a protective gas atmosphere.

Temperatures of maximally 220° C. are employed for this in connection with PA6.

According to the prior art is its possible by means of this to improve the final properties of the polymers, in particular to reduce the remaining proportion of unreacted lactam. In another processing variant, casting molds are filled with the activated lactam mixture and the cast parts are slowly polymerized.

In accordance with the prior art it is possible in this way to achieve excellent basic mechanical values, in particular high viscosity, injection molding stability and wear resistance.

A further variant is the employment of the activated lactam mixture for producing hollow bodies, preferably by means of the so-called rotomolding process. Preferred end products are containers with high break resistance or, for example, with good sealing properties against liquid media, in particular against fuels.

Therefore the invention also includes shaped lactam bodies which can be produced in accordance with the process of the invention.

The process in accordance with the invention will be described below by way of example. However, the scope of the invention is not limited by this in any way.

DETAILED DESCRIPTION

Examples 1 to 3 describe the production of liquid systems. To produce liquid systems it is recommended to work in a dry protective gas atmosphere. The component a) is placed into a vessel with an interior temperature measuring device and is heated to 30° to 70° C.

Afterwards the component c) is introduced while stirring and is homogeneously admixed. Following the formation of a clear solution and while controlling the temperature, which shall not exceed 90° C., the component b) and, following this and if required, the additive d), are added.

The resultant solutions are liquid at room temperature and stable when stored. They do not form crusts or slag, even in dry air.

Examples 4 to 6

In order to test using the liquid systems for initiating the activated anionic lactam polymerization, the following procedure is used:

A lactam melt is placed into a vessel with an interior temperature measuring device in a nitrogen atmosphere and the liquid system is introduced with the temperature being controlled and while stirring and is homogeneously dissolved.

Following activation, the lactam melt is poured into a mold which was preheated at 170° C. and is enclosed in a nitrogen atmosphere.

Thereby the comparison time t describes the period of time until the melt can no longer be stirred (pot time) and within which the activated melt must be poured into the mold. The melt is thereafter polymerized in the mold for 60 min at 170° C.

TABLE 1

Liquid Systems

| No | Components a) | Parts a) | Components b) | Parts b) | Components c) | Parts c) | Components d) | Parts d) | Remarks |
|---|---|---|---|---|---|---|---|---|---|
| 1 | NMP | 6.6 | Na—CL | 6.6 | CD | 6.6 | DOS | 80.2 | orange-yellow, clear liquid |
| 2 | DMI | 50 | Na—CL | 25 | CD | 25 | — | — | orange-yellow, clear liquid |
| 3 | DMPU | 50 | Na—CL | 30 | CL-MDI | 20 | — | — | yellow, clear liquid |

NMP: N-methyl-2-pyrrolidone
DMPU: N-N'-dimethylpropylene urea
DMI: N-N'-dimethylethylene urea
Na-CL: Sodium caprolactamate in caprolactam, apprx. 5% sodium content, Pacast AG, Sargans (CH)
CL-MDI: Methylene diisocyanate blocked with caprolactam, Grilbond IL6(R), Ems-Chemie AG, Domat/Ems (CH)
CD: Substituted diaryl carbodiimide, Stabaxol I(R), Rhein Chemie GmbH, Mannheim (FRG)
DOS: Di-octyl-sebacate, Edenol 888(R), Henkel KG, Dusseldorf (FRG)

TABLE 2

Use of the Liquid Systems of the Examples 1 to 3 for the Lactam Polymerization in a Monomer Casting Process

| No | Lactam | Parts | System acc. to | Parts | Melt-temperatur | Comp. time t | DSC-Melt pt. Polymer | Remarks |
|----|--------|-------|----------------|-------|-----------------|--------------|----------------------|---------|
| 1 | Laurinlactam | 100 | Example 1 | 10 | 175° C. | 300 sec | 172° C. | Plastized by d) no formation of voids |
| 2 | Laurinlactam | 100 | Example 2 | 4 | 175° C. | 200 sec | 170° C. | no formation of voids slight discoloration |
| 3 | Laurinlactam | 100 | Example 3 | 4 | 175° C, | 20 sec | 170° C. | no formation of voids no discoloration |

Examples 7 to 21

Further liquid systems are produced in the same manner as in Examples 1 to 3 and their composition is represented in Table 3.

Information regarding the performance of the activated anionic lactam polymerization, using the liquid systems, and the characterization of the products have been summarized in Table 4.

The performance is the same as in Tests 4 to 6. When the melt can no longer be stirred, polymerization was continued for 60 minutes at the stated temperature, and then the solution viscosity and the melting point of the polymer were measured.

The extractable part of all polymers was clearly below 1 weight-%.

A comparison of the varying times t shows that it is possible to affect the polymerization velocity by means of the composition of the liquid system.

TABLE 3

Liquid Systems

| No | Component a) | Parts a) | Component b) | Parts b) | Component c) | Parts c) | Component d) *) | Parts d) |
|----|--------------|----------|--------------|----------|--------------|----------|-----------------|----------|
| 7 | NMP<br>CL | 50<br>16.8 | Na—CL | 16.6 | CL-MDI | 16.6 | | |
| 8 | NMP | 30 | Na—CL | 30 | Bis-Ox | 10 | Rc-Ox | 30 |
| 9 | NMP | 6.6 | Na—CL | 6.6 | PCD | 6.6 | DOS | 80.2 |
| 10 | NOP | 50 | Na—CL | 25 | CD | 25 | | |
| 11 | DMI | 50 | Na—CL | 25 | CD | 25 | | |
| 12 | DMI | 60 | Na—CL | 20 | CD | 20 | | |
| 13 | DMPU | 50 | Na—CL | 30 | CL-MDI | 20 | | |
| 14 | DMPU | 48 | Na—CL | 19 | CL-MDI | 19 | PA | 14 |
| 15 | DMPU | 30 | Na—CL | 35 | Bis-Ox | 35 | | |
| 16 | TBH<br>NMP | 30<br>30 | Na—CL | 20 | CD | 20 | | |
| 17 | THE | 55 | Na—CL | 25 | CL-MDI | 20 | | |
| 18 | TMH<br>NMP | 40<br>20 | Na—CL | 20 | CL-MDI | 20 | | |
| 19 | TMH<br>TBH | 30<br>30 | Na—CL | 20 | Bis-Ox | 20 | | |
| 20 | TMH<br>TBH<br>NMP | 20<br>20<br>20 | Na—CL | 20 | CD | 20 | | |
| 21 | DMPU | 77 | Na—CL (100%) | 117 | DCC | 11.3 | | |

CL: Caprolactam
LL: Laurinlactam
NMP: N-methyl-2-pyrrolidone, BASF, Ludwigshafen (FRG) NOP: N-octyl-2-pyrrolidone, BASF, Ludwigshafen (FRG)
PCD: Polycarbodiimide Stabaxol P(R), Rhein Chemie GmbH, Mannheim (FRG)
DOS: Dioctyl sebacate, Edenol 888(R), Henkel KG, Dusseldorf(FRG)
PA: Phenolic antioxidant, Irganox 1135(R), Ciba-Geigy, Basel (CH)
*) Component d) additionally contains apprx. 70 weight-% of component b)(the lactam proportion)
DMPU: N,N'-dimethylpropylene urea, BASF Ludwigshafen (FRG)

TABLE 3-continued

Liquid Systems

| No | Component a) | Parts a) | Component b) | Parts b) | Component c) | Parts c) | Component d) *) | Parts d) |
|---|---|---|---|---|---|---|---|---|

DMI: N-N'-dimethylethylene urea, Siebner Hegner Rohstoffe, Zurich (CH)
TBH: Tetrabutyl urea, BASF, Ludwigshafen (FRG)
THE: Tetraethyl urea, Fluka AG, Buchs (CH)

TABLE 4

Use of the Liquid Systems of Examples 11 to 15 for the Lactam Polymerization

| Liquid system | Parts | Lactam | T °C. | t sec | Smp °C. | Relative Viskosity |
|---|---|---|---|---|---|---|
| 7  | 6  | CL | 140 | 70  | 211 |      |
| 8  | 3  | LL | 175 | 10  | 170 |      |
| 9  | 10 | LL | 175 | 320 | 176 |      |
| 10 | 3  | LL | 175 | 120 | 172 |      |
| 11 | 3  | LL | 175 | 80  | 175 |      |
| 12 | 3  | LL | 175 | 60  | 172 |      |
| 13 | 3  | LL | 175 | 22  | 172 |      |
| 14 | 3  | LL | 175 | 90  | 170 |      |
| 15 | 3  | LL | 175 | 10  | 171 |      |
| 16 | 3  | LL | 200 | 200 | 173 | 3.05 |
| 17 | 3  | LL | 200 | 10  | 169 | nmb  |
| 18 | 3  | LL | 200 | 8   | 166 | nmb  |
| 19 | 3  | LL | 200 | 14  | 166 | 6.0  |
| 20 | 3  | LL | 200 | 200 | 172 | 2.9  |
| 21 | 3  | LL | 200 | 200 | 175 | 2.9  |

T: Polymerization temperature
nmb: rel. solution viscosity very high, cannot be measured by conventional methods
t: Time until melt can no longer be stirred
Smp °C.: DSC melting point of the polymer
Relative solution viscosity of the polymer: 0.5% in m-cresol

Example 21

With the liquid system 21, the time $t_u$ as a function of the polymerization temperature T was recorded for a reaction of the lactam -12 of more than 99 weight-%.

TABLE 5

| Polimerization Temp. T [°C.] | 170 | 190 | 210 | 230 | 250 | 270 |
|---|---|---|---|---|---|---|
| Total Polymeriz. Time [sec] | 3500 | 1500 | 900 | 270 | 170 |   |

In further tests, minerals, dye pigments, ejecting agents and stabilizers were introduced into the lactam-12 melt, which was polymerized by the addition of 3 weight-% of the liquid system from Example 21.

Thus $Mg(OH)_2$, $Ca(OH)_2$, kaolin, micro-talc and $CaCO_3$ in the form of well-dried, powders were added and then polymerisation proceeded during 20 minutes at 220° C. Polymers with relative solution viscosities between 2.0 and 2.5 were the result of this process.

When using antioxidants, such as, for example, Irganox 245[R], Irgafos 168[R], Tinuvin 770[R] of Ciba-Geigy, it was shown that, since these additives have active H-atoms, which are not sufficiently sterically shielded, a concentration of 0.5 weight-% should not be exceeded.

Proportional amounts of clearly less than 1 weight-% are used in connection with defoaming agents and ejecting agents.

0.05 weight-% of the mold release agent, Brüggolen P12[R] of the Brüggemann company, Heilbronn (FRG) were sufficient for perfect removal of the shaped elements from the mold.

What is claimed is:

1. In a process for activated anionic lactam polymerization, comprising initiating polymerization in an anhydrous lactam melt, at least partially polymerizing said lactam melt, and shaping said at least partially polymerized melt, the improvement wherein said initiating of said anhydrous lactam melt is performed by adding to said anhydrous lactam-melt a liquid system composition consisting essentially of catalyst, activator and solvent.

2. The process in accordance with claim 1, wherein the lactam is selected from the group consisting of caprolactam, enantholactam, laurinlactam and their mixtures.

3. The process in accordance with claim 2, further comprising, following said initiating polymerization step, raising the temperature from an initial temperature to between about 200° and 320° C.

4. A composition for causing the polymerization of an anhydrous lactam melt by activated anionic lactam polymerization according to the process of claim 1, said composition consisting essentially of (a) 20 to 80 parts by weight of a base component and solvent of
   (a1) at least one N-substituted carboxylic acid amide compound,
   (a2) at least one N,N'-disubstituted urea compound, both of which can also contain a heterocyclic ring formed by their substituents, or
   (a3) both of said at least one (a1) compound and said at least one (a2) compound, (b) 5 to 30 parts by weight of at least one alkali or alkaline earth lactamate, (c) 5 to 30 parts by weight of at least one activator compound for activating the anionic lactam polymerization, wherein (a), (b) and (c) add up to 100 parts by weight, and which additionally optionally contains (d) process- or use-dependent additives, wherein said N-substituted carboxylic acid compound (a1) is selected from the group consisting of N,N-dimethyl-formamide, N,N-dimethylacetamide, N,N-dimethylpropionamide, N-phenyl-N-methyl acetamide, N-naphthyl-N-ethyl acetamide, N,N-diethyl isobutyramide, N-methylformanilide, N-ethylacetanilide, N-ethyl-4-nitroacetanilide, N,n-butyl acetanilide, N-ethyl-o-acetotoluidide, N,N'-p-phenylene-bis-acetanilide, 2-chloro-N-ethyl-acetanilide, N-N'-diphenyl-acetanilide, N,N'-diphenyl-formamide, N,N'-diethylformamide, N-methyl-N-1-naphthyl-acetamide, N,N-di-n-butylacetamide, N,N-diisopropyl-propionamide, N-butyl-N-octyldecanamide, N-N-dimethyl-benzamide, N,N-diethyl-p-toluamide, N-alkylpyrrolidones, N-phenyl caprolactam, N-ethyl-α-pyrrolidine, N-phenyl piperidone, N-isopropyl caprolactam, N-cyclohexyl dodecanolactam, N-acetyl pyridine, N-acetyl piperidine, N,N'-diacetyl piperazine, N-propionyl morpholine, N-acetyl morpholine, and mixtures thereof, and wherein the N,N'-disubstituted urea compound (a2) is selected from the group consisting of N,N'-dimethylene urea, N,N'-dimethylpropylene urea, tetramethyl urea, tetraethyl urea, tetra-butyl urea and mixtures thereof.

5. The process in accordance with claim 1, wherein the liquid system essentially consists of
   (a) 20 to 80 parts by weight of
       (a1) at least one N-substituted carboxylic acid amide compound,
       (a2) at least one N,N'-disubstituted urea compound, both of which can also contain a heterocyclic ring formed by their substituents, as the base component or solvent, or
       (a3) both of said at least one (a1) compound and said at least one (a2) compound,
   (b) 5 to 30 parts by weight of at least one alkali or alkaline earth lactamate,
   (c) 5 to 30 parts by weight of at least one compound activating the anionic lactam polymerization,
wherein (a), (b) and (c) add up to 100 parts by weight, and which additionally optionally contains
   (d) process- or use-dependent additives,
wherein the N-substituted carboxylic acid compounds (a1) are selected from the group consisting of N,N-dimethyl-formamide, N,N-dimethylacetamide, N,N-dimethylpropionamide, N-phenyl-N-methyl acetamide, N-naphthyl-N-ethyl acetamide, N,N-diethyl isobutyramide, N-methylformanilide, N-ethylacetanilide, N-ethyl-4-nitroacetanilide, N,n-butyl acetanilide, N-ethyl-o-acetotoluidide, N,N'-p-phenylene-bis-acetanilide, 2-chloro-N-ethyl-acetanilide, N-N'-diphenyl-acetanilide, N,N'-diphenyl-formamide, N,N'-diethylformamide, N-methyl-N-1-naphthyl-acetamide, N,N-di-n-butylacetamide, N,N-diisopropyl-propionamide, N-butyl-N-octyldecanamide, N-N-dimethyl-benzamide, N,N-diethyl-p-toluamide, N-alkylpyrrolidones, N-phenyl caprolactam, N-ethyl-α-pyrrolidine, N-phenyl piperidone, N-isopropyl caprolactam, N-cyclohexyl dodecanolactam, N-acetyl pyridine, N-acetyl piperidine, N,N'-diacetyl piperazine, N-propionyl morpholine, N-acetyl morpholine, and N-acetyl morpholine, and wherein the N,N'-disubstituted urea compounds (a2) are selected from the group consisting of N,N'-dimethylene urea, N,N'-dimethylpropylene urea, tetramethyl urea, tetraethyl urea and tetra-butyl urea.

6. The process in accordance with claim 5, wherein the liquid system composition is added in proportions of 0.5 to 15 parts by weight to 100 parts by weight of lactam melt.

7. The process in accordance with claim 6, wherein thixotroping additives are employed as additives.

8. The process in accordance with claim 7, wherein the liquid system composition is continuously dosed into an anhydrous lactam melt, is homogeneously mixed therewith, the mixture is continuously conveyed and is polymerized in the process at least sufficiently so that the melt stream can be directly conveyed to the shaping device, or is extruded as a strand which can be pelletized.

9. The process in accordance with claim 7, wherein the mixture of lactam and the liquid system composition is poured into casting molds and is polymerized there.

10. The process in accordance with claim 7, wherein the mixture of lactam and the liquid system composition is used for producing hollow bodies in accordance with the rotomolding process.

11. The process in accordance with claim 7, wherein the subsequent treatment of the polylactam is performed in a protective gas atmosphere below its melting temperature.

12. A polylactam body shaped by molding or extrusion which can be produced in accordance with one of the processes of claim 7.

13. The process in accordance with claim 2, wherein the liquid system essentially consists of
   (a) 20 to 80 parts by weight of
       (a1) at least one N-substituted carboxylic acid amide compound,
       (a2) at least one N,N'-disubstituted urea compound, both of which can also contain a heterocyclic ring formed by their substituents, as the base component and solvent, or
       (a3) both of said at least one (a1) compound and said at least one (a2) compound,
   (b) 5 to 30 parts by weight of at least one alkali or alkaline earth lactamate,
   (c) 5 to 30 parts by weight of at least one compound activating the anionic lactam polymerization,
wherein (a), (b) and (c) add up to 100 parts by weight, and that additionally selectively contain
   (d) process- or use-dependent additives, wherein the N-substituted carboxylic acid compounds (a1) are selected from the group consisting of N,N-dimethylformamide, N,N-dimethylacetamide, N,N-dimethylpropionamide, N-phenyl-N-methyl acetamide, N-naphthyl-N-ethyl acetamide, N,N-diethyl isobutyramide, N-methylformanilide, N-ethylacetanilide, N-ethyl-4-nitroacetanilide, N,n-butyl acetanilide, N-ethyl-o-acetotoluidide, N,N'-p-phenylene-bis-acetanilide, 2-chloro-N-ethyl-acetanilide, N-N'-diphenyl-acetanilide, N,N'-diphenyl-formamide, N,N'-diethylformamide, N-methyl-N-1-naphthyl-acetamide, N,N-di-n-butylacetamide, N,N-diisopropyl-propionamide, N-butyl-N-octyldecanamide, N-N-dimethyl-benzamide, N,N-diethyl-p-toluamide, N-alkylpyrrolidones, N-phenyl caprolactam, N-ethyl-α-pyrrolidine, N-phenyl piperidone, N-isopropyl caprolactam, N-cyclohexyl dodecanolactam, N-acetyl pyridine, N-acetyl piperidine, N,N'-diacetyl piperazine, N-propionyl morpholine, and N-acetyl morpholine, and wherein the N,N'-disubstituted urea compounds (a2) are selected from the group consisting of N,N'-dimethylene urea, N,N'-dimethylpropylene urea, tetramethyl urea, tetraethyl urea and tetra-butyl urea.

14. The process in accordance with claim 1, wherein the liquid system composition is added in proportions of 0.5 to 15 parts by weight to 100 parts by weight of lactam melt.

15. The process in accordance with claim 1, wherein thixotroping additives are employed as additives.

16. The process in accordance with claim 1, wherein the liquid system composition is continuously dosed into an anhydrous lactam melt, is homogeneously mixed therewith, the mixture is continuously conveyed and is polymerized in the process at least sufficiently so that the melt stream can be directly conveyed to the shaping device, or is extruded as a strand with can be pelletized.

17. The process in accordance with claim 1, wherein the mixture of lactam and the liquid system composition is poured into casting molds and is polymerized there.

18. The process in accordance with claim 1, wherein the mixture of lactam and the liquid system composition is used for producing hollow bodies in accordance with the roto-molding process.

19. The process in accordance with claim 1, wherein the subsequent treatment of the polylactam is performed, in a protective gas atmosphere below its melting temperature.

20. A polylactam body shaped by molding or extrusion which can be produced in accordance with the process of claim 1.

* * * * *